(12) United States Patent
Kobayashi et al.

(10) Patent No.: US 9,167,836 B2
(45) Date of Patent: Oct. 27, 2015

(54) PERFUME COMPOSITION

(75) Inventors: Noriaki Kobayashi, Tokyo (JP); Kenji Kumazawa, Chiba (JP); Osamu Nishimura, Chiba (JP); Yasumichi Mizota, Kanagawa (JP)

(73) Assignee: OGAWA & CO., LTD., Tokyo (JP)

( * ) Notice: Subject to any disclaimer, the term of this patent is extended or adjusted under 35 U.S.C. 154(b) by 1712 days.

(21) Appl. No.: 12/445,301

(22) PCT Filed: Oct. 1, 2007

(86) PCT No.: PCT/JP2007/069205
§ 371 (c)(1),
(2), (4) Date: Feb. 3, 2010

(87) PCT Pub. No.: WO2008/044525
PCT Pub. Date: Apr. 17, 2008

(65) Prior Publication Data
US 2010/0143562 A1    Jun. 10, 2010

(30) Foreign Application Priority Data
Oct. 13, 2006   (JP) ................................ 2006-279740

(51) Int. Cl.
| | |
|---|---|
| *A23C 9/152* | (2006.01) |
| *A23L 1/226* | (2006.01) |
| *A21D 2/28* | (2006.01) |
| *A23C 9/156* | (2006.01) |
| *A23C 11/00* | (2006.01) |
| *A23D 7/005* | (2006.01) |
| *A23D 9/007* | (2006.01) |
| *A23L 2/56* | (2006.01) |

(52) U.S. Cl.
CPC ............... *A23L 1/22671* (2013.01); *A21D 2/28* (2013.01); *A23C 9/156* (2013.01); *A23C 11/00* (2013.01); *A23D 7/0053* (2013.01); *A23D 7/0056* (2013.01); *A23D 9/007* (2013.01); *A23L 1/22692* (2013.01); *A23L 2/56* (2013.01)

(58) Field of Classification Search
USPC .................................................. 426/549, 535
See application file for complete search history.

(56) References Cited

U.S. PATENT DOCUMENTS

| | | | | |
|---|---|---|---|---|
| 3,931,246 | A * | 1/1976 | Winter et al. ................. | 549/472 |
| 3,993,792 | A * | 11/1976 | Winter et al. ................. | 426/535 |
| 4,055,578 | A * | 10/1977 | Evers ............................ | 549/475 |
| 2003/0157235 | A1* | 8/2003 | Maier et al. .................. | 426/594 |

FOREIGN PATENT DOCUMENTS

| | | |
|---|---|---|
| CN | 1097747 | 1/1995 |
| CN | 1097748 | 1/1995 |
| CN | 1308076 | 8/2001 |
| JP | 2003 52330 | 2/2003 |
| JP | 2005 15685 | 1/2005 |

OTHER PUBLICATIONS

Office Action issued Apr. 17, 2012 in Japanese Application No. 2006-279740.
Gerard Mosciano, "Oxford Chemicals", Perfumer & Flavorist, vol. 26, 2001, pp. 68, 70-71.
Watts, S. H. et al., "The contribution of MMFDS to the flavour of Scotch whisky", Distilled Spirits, Chapter 26, pp. 181-185, (2004).
Mottram, Donald S. et al., The Interaction of Disulfide Flavor Compounds with Proteins in Model Systems, Adv. Exp. Med. Biol., vol. 542, pp. 147-153, (2004).
Nishimura, O. et al., "Identification of Volatile Flavor Components of the Oil from Roasted Sesame Seeds", Perfumery and Flavoring, No. 165, pp. 91-101, 1990, (with partial English translation).
Zhong, K. -J et al., "Fingerprint analysis of coffee flavor with GC—MS and principal component analysis and differentiation of little difference samples", Chinese Journal of Analysis Laboratory, vol. 25, No. 8, pp. 119-122), 2006.
Osawa, Naoto "Dairy Products and Their Flavors", Kouryou, No. 153, pp. 37-47, 1987, (with partial English translation).
Leffingwell, John C. et al., "GRAS Flavor Chemicals-Detection Thresholds", Perfumer and Flavorist, vol. 16, No. 1, pp. 1-19, (1991).
Leffingwell, John C. et al., "GRAS and EC Flavor Chemicals Report", Flavor-Base, Total 8 pages. (2004).
Dubs, Von Paul et al., "133. Eine neue Methode zur Herstellung gemischter Disulfide", Helvetica Chimica Acta, vol. 59, No. 4, pp. 1307-1311, (1976).

\* cited by examiner

*Primary Examiner* — Michele L Jacobson
*Assistant Examiner* — Bhaskar Mukhopadhyay
(74) *Attorney, Agent, or Firm* — Oblon, McClelland, Maier & Neustadt, L.L.P.

(57) ABSTRACT

There is provided a flavor composition that can impart and augment the natural, fresh and milk-rich feeling of dairy products to a necessary and sufficient level, which is a flavor composition for milk, dairy products, foods or beverages containing milk and dairy products, or dairy product substitutes, characterized by containing a trace amount of one or more disulfide compounds selected from the group consisting of methyl 2-methyl-3-furyl disulfide, bis(2-methyl-3-furyl) disulfide, methyl furfuryl disulfide and difurfuryl disulfide, as dairy products to which the flavor composition is added.

4 Claims, No Drawings

PERFUME COMPOSITION

TECHNICAL FIELD

The present invention relates to a flavor composition which imparts and augments a natural feeling, a fresh feeling and milk-rich feeling, for milk, dairy products, foods or beverages containing milk or dairy products, and dairy product substitutes (these will collectively be referred to as "dairy products"), and more specifically it relates to a flavor composition for milk flavoring which imparts and augments a natural, milk-rich feeling and flavor characteristic of dairy products which is non-existent in the prior art, by addition of a trace amount of one or more disulfide compounds selected from the group consisting of methyl 2-methyl-3-furyl disulfide, bis(2-methyl-3-furyl)disulfide, methyl furfuryl disulfide and difurfuryl disulfide, as well as to dairy products to which the flavor composition is added and to a method for augmenting the flavor of dairy products.

BACKGROUND ART

The demand for products of greater variety is increasing with the ever-diversifying preferences of consumers in recent years. There is, particularly in the foods and beverages industry, a strong demand for development of various and diverse foods and beverages that can satisfy consumer preferences. Currently, this demand is not being satisfactorily met with only the aroma compounds proposed and studied in the prior art as flavors and fragrances that are among the starting materials for foods, beverages and cosmetic products.

It has therefore become urgent to provide a variety of aroma substances having unique fragrance and flavor properties that are new to the prior art and can meet the needs of different individual products, and to develop a natural flavor composition that can impart a natural flavor conforming to consumer desires for natural products, as well as foods and beverages containing it. A particular demand exists for aroma compounds with more natural flavors for dairy products such as milk, butter and cheese.

Such flavor is an aromatic flavor that includes a natural feel evocative of fresh milk, a non-degenerated fresh feel similar to sterilized milk, and a warm, milk-rich feeling that approaches that of milk fat or milk itself.

The compound 4-methyl-5-thiazoleethanol (sulfurol) is known in the prior art to impart a natural, milk-rich feeling and flavor characteristic of dairy products (see Non-patent document 1). This compound, however, has not been found in dairy products. Also, since the compound has a threshold of 10,800 ppb (see Non-patent document 2) and is not associated with a strong aroma, it has been necessary to add a substantial amount of the compound to flavor compositions in order to exhibit characteristic odor.

It has been proposed that the thick and voluminous texture characteristic of milk can be imparted to and augmented in dairy products by adding 3-methylnonane-2,4-dione, a compound found in vegetables and teas (see Patent document 1). However, although the compound can impart a thick and voluminous texture to dairy products, its effect of imparting a natural and fresh feel similar to freshly obtained milk has been insufficient.

[Patent document 1] Japanese Unexamined Patent Publication No. 2003-52330
[Non-patent document 1] *Kouryou*, 153, 37-, 1987
[Non-patent document 2] Perfumer & Flavorist, 16, Jan./Feb., 1-19, 1991

DISCLOSURE OF THE INVENTION

Problems to be Solved by the Invention

It is an object of the present invention to provide a flavor composition that can impart and further augment a natural feel, fresh feel and milk-rich feeling in dairy products to a necessary and sufficient level, as well as dairy products containing the flavor composition, and a method for augmenting the flavor of dairy products.

Means for Solving the Problems

Upon careful examination of flavor components in milk, the present inventors have discovered a trace component with a major impact on aroma, consisting of multiple compounds, and have identified their structures as methyl 2-methyl-3-furyl disulfide, bis(2-methyl-3-furyl)disulfide, methyl furfuryl disulfide and difurfuryl disulfide.

As a result of examining the flavor properties of methyl 2-methyl-3-furyl disulfide, bis(2-methyl-3-furyl)disulfide, methyl furfuryl disulfide and difurfuryl disulfide, the present inventors have found that they have properties such that their trace addition elicits the natural feel, fresh feel and milk-rich feeling of dairy products and that they can contribute to flavor in smaller amounts than flavor substances known in the prior art for milk and dairy products, and upon further discovery of the new knowledge that it is possible to provide a flavor composition capable of imparting natural flavor by addition of these compounds to flavor mixtures, the invention has been completed.

Specifically, the invention provides a flavor composition for milk, a dairy product, a food or beverage containing milk or a dairy product, or a dairy product substitute, characterized by containing one or more disulfide compounds selected from the group consisting of methyl 2-methyl-3-furyl disulfide represented by formula (1), bis(2-methyl-3-furyl)disulfide represented by formula (2), methyl furfuryl disulfide represented by formula (3) and difurfuryl disulfide represented by formula (4), shown below.

[Chemical Formula 1]

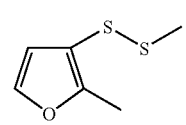

(1)

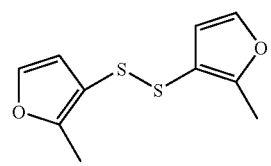

(2)

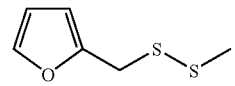

(3)

(4)

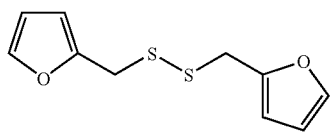

The invention is further characterized in that the flavor composition contains one or more disulfide compounds at 100 ppm-0.1 ppb, and in that the dairy product substitute for the composition is a cream substitute, shortening, margarine or fat spread.

The invention still further provides milk, a dairy product, a beverage containing milk or a dairy product, or a dairy product substitute, characterized by comprising an effective amount of one or more disulfide compounds selected from the group consisting of methyl 2-methyl-3-furyl disulfide, bis(2-methyl-3-furyl)disulfide, methyl furfuryl disulfide and difurfuryl disulfide.

The invention yet further provides a method for augmenting the flavor of milk, dairy products, beverages containing milk or dairy products, or dairy product substitutes, characterized by addition of 10-0.001 ppb of one or more disulfide compounds.

Effect of the Invention

The flavor composition of the invention can impart and augment the hitherto elusive natural feel, fresh feel, milk-rich feeling and flavor characteristic of dairy products, by its trace addition to dairy products such as milk, cheese and butter products.

BEST MODE FOR CARRYING OUT THE INVENTION

<1> Essential Components of Flavor Composition

The methyl 2-methyl-3-furyl disulfide, bis(2-methyl-3-furyl)disulfide, methyl furfuryl disulfide and difurfuryl disulfide used for the invention are known compounds, and their use in flavors has been proposed (see FLAVOR-BASE 2004, Copyright 1989-2004 by John C. Leffingwell, LEFFINGWELL & ASSOCIATES). Specifically, methyl 2-methyl-3-furyl disulfide has a sulfur-like, meaty, medium-like roast odor, while bis(2-methyl-3-furyl)disulfide has a cooked meat-like, quality meat-like odor, and these can be used as meat-, onion- and seasoning-like flavors. Also, methyl furfuryl disulfide has a coffee-like, cooked pork meat-like and wheat bread-like odor, while difurfuryl disulfide has a coffee-like, meaty odor.

Because of their odor properties, these four disulfide compounds can be used for coffee-, meat- and onion-like flavors.

However, it has not been known from the aforementioned documents that addition of such disulfide compounds in very trace amounts to flavor compositions for dairy products can reproduce the natural feel, fresh feel and milk-rich feeling of dairy products.

A method for synthesizing methyl 2-methyl-3-furyl disulfide from dimethyl carbonate and 2-methyl-3-furanthiol in the presence of sodium sulfite in basic aqueous solution has been reported (see Faming Zhuanli Shenqing Gongkai Shuomingshu (2001), 7 pp. CODEN: CNXXEV CN 1308076 A 20010815 Patent written in Chinese).

Similarly a method is known for obtaining bis(2-methyl-3-furyl)disulfide by, for example, mixing 2-methyl-3-furanthiol and DMSO in a molar ratio of 1:0.5-1:10 and stirring the mixture at room temperature for 10 hours (see Faming Zhuanli Shenqing Gongkai Shuomingshu (1995), 5 pp. CODEN: CNXXEV CN 1097747 A 19950125 Patent written in Chinese).

An example of synthesizing methyl furfuryl disulfide by asymmetrical disulfidation via an alkylthiodialkylsulfonium salt has also been reported (see Helvetica Chimica Acta (1976), 59(4), 1307-11).

A method is further known for obtaining difurfuryl disulfide by, for example, mixing furfurylthiol and DMSO in a molar ratio of 1:0.5-1:10 and stirring the mixture at room temperature for 10 hours (see Faming Zhuanli Shenqing Gongkai Shuomingshu (1995), 5 pp. CODEN: CNXXEV CN 1097748 A 19950125 Patent written in Chinese).

Methyl 2-methyl-3-furyl disulfide is commercially available as a product by, for example, Wako Pure Chemical Industries, Ltd., Sigma Aldrich, U.S. or Acros Organics, Belgium, bis(2-methyl-3-furyl)disulfide is commercially available as a product by Acros Organics, Belgium, and methyl furfuryl disulfide and difurfuryl disulfide are commercially available as products by Sigma Aldrich, U.S. and Oxford Chemical, U.K.

The methyl 2-methyl-3-furyl disulfide, bis(2-methyl-3-furyl)disulfide, methyl furfuryl disulfide and difurfuryl disulfide used as active ingredients according to the invention may be used alone in combination, and they may also be used as mixtures with other flavor components in any desired proportion.

When methyl 2-methyl-3-furyl disulfide, bis(2-methyl-3-furyl)disulfide, methyl furfuryl disulfide and difurfuryl disulfide are used in a flavor composition, the amount of addition will differ depending on the purpose and the type of flavor composition, but it may be, generally speaking, in a range of 100 ppm-0.1 ppb and preferably 10 ppm-1 ppb with respect to the total flavor composition. If used at less than 0.1 ppb the effect of addition will not be adequately exhibited, and if used at greater than 100 ppm the characteristics of the added substance will be too strong, potentially upsetting the flavor balance of the flavor composition as a whole.

<2> Additional Components

There are no particular restrictions on other flavor components to be added to the flavor composition of the invention, and as examples there may be mentioned those listed in "Patent Office Report: Collection of Well-Known Prior Arts (Flavor & Fragrance), Class II Flavors", p. 258-334, which include alcohols such as octanol, heptanol and phenylethanol; aldehydes such as hexanal, heptanal and vanillin; ketones such as acetoin, diacetyl, 2-pentanone, 3-hexanone, 2-heptanone, 2-octanone, 2-nonanone, 2-undecanone and 2-tridecanone; and acids such as acetic acid, butyric acid, 5-decenoic acid, caproic acid, caprylic acid, lauric acid and myristic acid.

There may also be mentioned known synthetic flavor components which include esters such as ethyl hexanoate, ethyl butyrate, ethyl levulinate, butyl butyryllactate, phenylethyl acetate and ethyl myristate; lactones such as γ-decalactone, γ-undecalactone, γ-dodecalactone, δ-octalactone, δ-decalactone, δ-undecalactone, δ-dodecalactone, δ-tridecalactone and γ-nonalactone; and sulfur compounds including thiols such as methylmercaptan; thioethers such as dimethyl sulfide and dimethyl disulfide, and methional, as well as products of solvent extraction or steam distillation of dairy products or enzyme treatment of dairy products with lipases, proteases or lactases, or dairy product flavors obtained from thermal reaction with amino acids/proteins and saccharides, and these may also be used in any desired combination as a mixed flavor composition.

<3> Flavor Composition Production Process

The flavor composition of the invention may be prepared by appropriately combining a disulfide compound as the essential component with additional components such as the aforementioned flavor components as necessary, and mixing them by an ordinary method. For example, they may be added to dairy products as appropriate mixtures with water, ethanol, propylene glycol, glycerin and mixed solvents thereof, or vegetable fats and oils, animal fats and oils, medium chain fatty acid triglycerides and mixed solvents containing them.

The flavor composition may be appropriately used as a formulation, depending on the form of the dairy product to which it is to be added. For example, it may be added to a dairy product as an emulsified flavoring obtained using an emulsifier, or as a powder obtained using an excipient.

<4> Target Products

The targets for addition of the flavor composition of the invention are dairy products, and specifically (a) milk, (b) dairy products, (c) foods and beverages containing milk or dairy products and (d) dairy product substitutes, without any particular restrictions, and the following may be mentioned as examples.

As (a) milk there may be mentioned raw milk, milk, special milk, partial nonfat milk, processed milk and the like as specified in "Ordinance On Milk and Dairy Product Component Standards" (Health and Welfare Ministry Ordinance No. 52, Dec. 27, 1951).

As (b) dairy products there may be mentioned cream, butter, butter oil, fermented milk such as yogurt, lactic acid bacteria beverages, milk beverages, cheese, ice cream, concentrated milk, defatted concentrated milk, condensed milk, whole milk powder, skim milk powder, sweetened condensed milk, whey concentrate and whey powder, as specified in the aforementioned Ordinance.

As examples of (c) foods and beverages containing milk or dairy products there may be mentioned coffee beverages, tea beverages, juices, carbonated beverages, frozen desserts, western confectioneries such as candies, cookies and biscuits, Japanese confectioneries, breads, instant foods and beverages including curry or cream stew, or cream soup, snack foods, seasonings such as dressings, and the like, which contain the above-mentioned milk, cream, butter, cheese, condensed milk or powdered milk.

As examples of (d) dairy product substitutes there may be mentioned butter substitutes such as margarine, shortening and fat spread that are produced by emulsification of vegetable fats and oils, and cream substitutes such as coffee whiteners, that are added to coffee and black tea.

The effective amount of the flavor composition of the invention to be added to a dairy product cannot be generalized because of the wide variety of product types and production processes, but the concentration of disulfide compounds with respect to the dairy products mentioned as examples above may be in the range of 10-0.001 ppb and preferably 1-0.001 ppb, which will be able to significantly augment the aromatic flavor producing the natural feel, fresh feel and milk-rich feeling normally associated with fresh dairy products. If the disulfide compound addition to the dairy product is greater than 10 ppb, it will tend to give way to a more meaty, roast-like aroma to milk.

EXAMPLES

The present invention will now be explained in greater detail by the following examples, with the understanding that the invention is in no way restricted to the examples.

Example 1

Of the disulfide compounds used in the flavor compositions, methyl 2-methyl-3-furyl disulfide and bis(2-methyl-3-furyl)disulfide were products by Acros Organic. The methyl furfuryl disulfide and difurfuryl disulfide used were products of Sigma Aldrich.

(1) Experiment Method

Each of methyl 2-methyl-3-furyl disulfide, bis(2-methyl-3-furyl)disulfide, methyl furfuryl disulfide and difurfuryl disulfide were added to commercially available ultrahigh temperature (UHT) sterilized milk to final concentrations of 100 ppb, 10 ppb, 1 ppb, 0.1 ppb, 0.01 ppb and 0.001 ppb, respectively.

As a comparative control there was used UHT sterilized milk without addition of a disulfide compound.

(2) Evaluation Method

An sensory evaluation was conducted to judge whether the dairy product had a "natural milk-rich" feeling. The sensory evaluation was carried out by points on a 5-level scale and comments, by 10 professional panelists.

Specifically, the "natural milk-rich feeling of a dairy product" without addition of methyl 2-methyl-3-furyl disulfide, bis(2-methyl-3-furyl)disulfide, methyl furfuryl disulfide or difurfuryl disulfide was assigned 2 points. For addition of the disulfide compounds, a stronger feel than the non-added product was assigned 3 points, an even stronger feel was assigned 4 points, a weaker feel was assigned 1 point and no feel was assigned 0 points, and the mean value for the points recorded by the 10 panelists was determined.

Comments on impressions regarding the beverages were also received during the evaluation, and frequent opinions were recorded. The scores and comments for each beverage are shown in Table 1.

TABLE 1

| | Sensory evaluation results | | | | | | | |
|---|---|---|---|---|---|---|---|---|
| Final concentration | Methyl 2-methyl-3-furyl disulfide | | Bis(2-methyl-3-furyl) disulfide | | Methylfurfuryl disulfide | | Difurfuryl disulfide | |
| (ppb) | Points | Comment | Points | Comment | Points | Comment | Points | Comment |
| 100 | 4.0 | Roast aroma, meaty | 4.0 | Roast aroma, meaty | 4.0 | Coffee-like | 4.0 | Coffee-like |
| 10 | 3.7 | Roast aroma, meaty | 3.4 | Fermented-like | 3.7 | Coffee-like | 4.0 | Coffee-like |

TABLE 1-continued

Sensory evaluation results

| Final concentration (ppb) | Methyl 2-methyl-3-furyl disulfide Points | Comment | Bis(2-methyl-3-furyl) disulfide Points | Comment | Methylfurfuryl disulfide Points | Comment | Difurfuryl disulfide Points | Comment |
|---|---|---|---|---|---|---|---|---|
| 1 | 3.2 | Fermented-like | 2.8 | Boiled feel | 3.0 | Fermented-like | 3.4 | Volume feel |
| 0.1 | 2.9 | Natural feel | 2.8 | Natural feel | 2.9 | Fresh feel | 3.1 | Volume feel |
| 0.01 | 2.3 | Milk-rich | 2.8 | Natural feel | 2.3 | Fresh feel | 2.8 | Milk-rich |
| 0.001 | 2.3 | Milk-rich | 2.4 | Fresh feel | 2.3 | Milk-rich | 2.6 | Fresh feel |

\* Roast aroma: Similar to heated food
Fermented-like: Similar to fermented foods such as yogurt or cheese
Boiled feel: Similar to warmed milk As is clear from Table 1, methyl 2-methyl-3-furyl disulfide, bis(2-methyl-3-furyl)disulfide, methyl furfuryl disulfide and difurfuryl disulfide all imparted and augmented the natural feel, fresh feel and milk-rich feeling of UHT sterilized milk at addition concentrations of 0.001-1 ppb. The milk-rich feeling was strongly noticed at a concentration exceeding 1 ppb, but a coffee-like and meat-like flavor and roast aroma were also noticed, while at greater than 10 ppb a strong coffee-like and meat-like flavor and roast aroma were noticed with all of the four disulfides. The overall flavor balance was favorable with addition at 0.001-1 ppb.

Example 2

A flavor composition (Comparison Product 1) was prepared by mixing the following formulation by an ordinary method.

TABLE 2

Flavor composition (Comparison product 1)

| Component | Content (parts by wt.) |
|---|---|
| δ-Decalactone | 2.5 |
| γ-Dodecalactone | 1.0 |
| Decanoic acid | 150.0 |
| Dodecanoic acid | 50.0 |
| Vanillin | 25.0 |
| Ethylmaltol | 35.0 |
| Diacetyl | 5.0 |
| Acetoin | 7.5 |
| Propylene glycol | 724.0 |
| Total | 1000.0 |

With 1000 parts by weight of Comparison Product 1 there were mixed 0.1 part by weight of a 0.1% alcohol solution of methyl 2-methyl-3-furyl disulfide and 0.1 part by weight of a 0.01% alcohol solution of bis(2-methyl-3-furyl)disulfide, to prepare a flavor composition (Invention Product 1).

Comparison Product 1 and Invention Product 1 were evaluated by the 10 professional panelists. As a result, all of the 10 professional panelists evaluated Invention Product 1 containing the aforementioned compounds as having improved natural feeling, fresh feeling and milk-rich flavor.

Example 3

Invention Product 2 and Comparison Product 2 as "milk beverages (1)" were prepared by mixing in the manner described below by an ordinary method.

A comparative evaluation was conducted by the 10 professional panelists.

As a result, all of the 10 professional panelists evaluated Invention Product 2, with addition of a flavor composition containing a specific disulfide compound of the invention, as being a milk beverage with the natural, milk-rich feeling characteristic of milk and augmented flavor characteristic of sterilized milk.

TABLE 3

Milk beverage (1)

| Component | Invention product 2 (parts by wt.) | Comparison product 2 (parts by wt.) |
|---|---|---|
| UHT sterilized milk | 100.0 | 100.0 |
| Flavor composition (Invention product 1) | 1.0 | — |
| Flavor composition (Comparison product 1) | — | 1.0 |

Example 4

Invention Product 3 and Comparison Product 3 as "milk beverages (2)" were prepared by mixing with the following formulation by an ordinary method.

A comparative evaluation was conducted by the 10 professional panelists.

As a result, all of the 10 professional panelists evaluated Invention Product 3, with addition of a flavor composition containing a specific disulfide compound of the invention, as having a natural, milk-rich feeling and improved thickness characteristic of milk.

TABLE 4

Milk beverage (2)

| Component | Invention product 3 (parts by wt.) | Comparison product 3 (parts by wt.) |
|---|---|---|
| Coffee extract (Bx.2.7) | 300.0 | 300.0 |
| Baking soda | 1.0 | 1.0 |
| Granulated sugar | 60.0 | 60.0 |
| UHT sterilized milk | 200.0 | 200.0 |
| Whole milk powder | 24.0 | 24.0 |
| Water | 414.0 | 414.0 |
| Flavor composition (Invention product 1) | 1.0 | — |

TABLE 4-continued

Milk beverage (2)

| Component | Invention product 3 (parts by wt.) | Comparison product 3 (parts by wt.) |
|---|---|---|
| Flavor composition (Comparison product 1) | — | 1.0 |
| Total | 1000.0 | 1000.0 |

Example 5

Invention Product 4 and Comparison Product 4 as "dairy product substitutes" were prepared by mixing with the following formulation by an ordinary method.

A comparative evaluation was conducted by the 10 professional panelists.

As a result, all of the 10 professional panelists evaluated Invention Product 4, with addition of a flavor composition containing a specific disulfide compound of the invention, as having a natural, milk-rich feeling and improved thickness characteristic of milk.

TABLE 5

Dairy product substitute

| Component | Invention product 4 (parts by wt.) | Comparison product 4 (parts by wt.) |
|---|---|---|
| Coffee whitener (Non-flavored/powder) | 300.0 | 300.0 |
| Water | 199.7 | 199.7 |
| Flavor composition (Invention product 1) | 0.3 | — |
| Flavor composition (Comparison product 1) | — | 0.3 |
| Total | 500.0 | 500.0 |

INDUSTRIAL APPLICABILITY

The flavor composition of the invention can impart and augment the hitherto elusive natural feel, fresh feel, milk-rich feeling and flavor characteristic of dairy products, by its trace addition to dairy products such as milk, cheese and butter products.

The invention claimed is:

1. A Milk, a dairy product, a food or beverage containing milk or a dairy product, or a dairy product substitute, comprising the addition of from 0.001 ppb to 0.1 ppb of one or more disulfide compounds selected from the group consisting of bis (2-methyl-3-furyl) disulfide, methyl furfuryl disulfide and difurfuryl disulfide.

2. A method for augmenting the flavor of milk, a dairy product, a food or beverage containing milk or a dairy product, or a dairy product substitute, comprising adding thereto from 0.001 ppb to 0.1 ppb of one or more disulfide compounds selected from the group consisting of bis(2-methyl-3-furyl) disulfide, methyl furfuryl disulfide and difurfuryl disulfide.

3. A Milk, a dairy product, a food or beverage containing milk or a dairy product, or a dairy product substitute, comprising the addition of from 0.001 ppb to 0.1 ppb of one or more disulfide compounds selected from the group consisting of methyl furfuryl disulfide and difurfuryl disulfide.

4. A method for augmenting the flavor of milk, a dairy product, a food or beverage containing milk or a dairy product, or a dairy product substitute, comprising adding thereto from 0.001 ppb to 0.1 ppb of one or more disulfide compounds selected from the group consisting of methyl furfuryl disulfide and difurfuryl disulfide.

* * * * *